(12) United States Patent
White

(10) Patent No.: US 12,214,517 B2
(45) Date of Patent: Feb. 4, 2025

(54) CHAINSAW LIMB GRIPPING ATTACHMENT SYSTEM

(71) Applicant: Steve White, Peeples Valley, AZ (US)

(72) Inventor: Steve White, Peeples Valley, AZ (US)

( * ) Notice: Subject to any disclaimer, the term of this patent is extended or adjusted under 35 U.S.C. 154(b) by 0 days.

(21) Appl. No.: 17/378,725

(22) Filed: Jul. 18, 2021

(65) Prior Publication Data

US 2023/0019035 A1  Jan. 19, 2023

(51) Int. Cl.
*B27B 17/00* (2006.01)
*A01G 23/095* (2006.01)
*B27B 17/02* (2006.01)

(52) U.S. Cl.
CPC ........ *B27B 17/0083* (2013.01); *A01G 23/095* (2013.01); *B27B 17/02* (2013.01)

(58) Field of Classification Search
CPC ..... B27B 17/00; B27B 17/02; B27B 17/0083; A01G 23/095
USPC .......................................................... 30/378
See application file for complete search history.

(56) References Cited

U.S. PATENT DOCUMENTS

| | | | | |
|---|---|---|---|---|
| 2,708,953 A * | 5/1955 | Dichl | ................. | B27B 17/0083 144/306 |
| 2,798,516 A * | 7/1957 | Heal | .................. | B27B 17/0008 30/386 |
| 2,813,556 A * | 11/1957 | Woodworth | ........ | B27B 17/0083 30/371 |
| 4,558,518 A * | 12/1985 | Morabit | ............... | B27G 19/003 30/372 |
| 5,669,145 A * | 9/1997 | Skripsky | ............. | B27B 17/0083 30/382 |
| 6,073,528 A * | 6/2000 | Porter | ................. | B27B 17/0083 83/454 |
| 6,536,119 B1 * | 3/2003 | Carr | ....................... | A01G 3/053 30/382 |

* cited by examiner

*Primary Examiner* — Nhat Chieu Q Do
(74) *Attorney, Agent, or Firm* — Keith Miller Patent Law; Keith A. Miller

(57) ABSTRACT

A chainsaw limb gripping attachment system comprising a chainsaw comprising a motor with a handle configured for holding by a user, and a blade configured to extend away from the motor, the blade comprising a guide bar and a plurality of cutting teeth positioned around a periphery of the guide bar and configured to rotate; and a gripper bar comprising a center section removably attached to the guide bar, an upper section extending upwardly from the center section, and a lower section extending downwardly from the center section. The gripper bar comprises a first gripping section on a proximal edge of the upper section, the first gripping section comprising a first plurality of teeth. The gripper bar further comprises a second gripping section disposed on a distal edge of the lower section, the second gripping section comprising a second plurality of teeth.

9 Claims, 5 Drawing Sheets

CHAINSAW LIMB GRIPPING ATTACHMENT SYSTEM

FIELD OF THE INVENTION

The present invention generally relates to an attachment for a motorized cutting tool. More particularly, the present invention relates to an attachment for a chainsaw to safely and efficiently cut small twigs and limbs from a larger tree.

BACKGROUND OF THE INVENTION

Chainsaws are a common power tool designed mainly for the purpose of cutting large wooden objects such as trees and large limbs or timbers. Chainsaws are powered by either a gasoline engine or an electric motor. In either case, chainsaws are portable. Although chainsaws are very effective when used to cut relatively large wooden objects, they are not so effective when used to cut small limbs and twigs which are springy and whippy. When a chainsaw is used to cut small limbs and twigs, these items will often be pulled and kicked back away from the chainsaw making both difficult and dangerous to attempt to cut these small springy, whippy items.

In this manner, when downing a tree, a user would then have to change to a different tool to then remove the various sized limbs and branches from the downed tree. There have been developed, and are known, a number of attachments for chainsaws that attempt to solve some of these problems. Many are very specialized or restrictive in their uses. Examples include devices designed for cutting brush and/or hedges, which include multiple bars. However, none of these devices incorporates any type of gripping teeth configured to hold a small branch or limb in place while the blade of the chainsaw cuts it.

Therefore, a problem remains where a user of a chainsaw used to cut down trees but cannot efficiently use the same chainsaw to remove the smaller limbs and branches on the downed tree.

BRIEF SUMMARY OF THE INVENTION

The present invention overcomes the problems cited above by providing a chainsaw attachment configured to hold smaller branches and limbs still while using the chainsaw to remove them from a tree.

The invention is a chainsaw limb gripping attachment system comprising a chainsaw comprising a motor with a handle configured for holding by a user, and a blade configured to extend away from the motor, the blade comprising a guide bar and a plurality of cutting teeth positioned around a periphery of the guide bar and configured to rotate; and a gripper bar comprising a center section removably attached to the guide bar, an upper section extending upwardly from the center section, and a lower section extending downwardly from the center section. The gripper bar further comprises a first gripping section on a proximal edge of the upper section, the first gripping section comprising a first plurality of teeth. The first gripping section is configured to hold a limb in place for the plurality of cutting teeth to cut.

The gripper bar of the chainsaw limb gripping attachment system further comprises a second gripping section disposed on a distal edge of the lower section, the second gripping section comprising a second plurality of teeth.

The first and second plurality of teeth are configured to curve toward the guide bar and plurality of cutting teeth.

The gripper bar further comprises a spacer between the gripper bar center section and the guide bar. Alternatively, the spacer is integral to a side of the gripper bar center section.

Alternatively, the upper and lower sections further comprise a first bend configured to position the upper and lower sections away from the plurality of cutting teeth. Additionally, the upper and lower sections further comprise a second bend configured to position the upper and lower sections parallel to the guide bar The gripping section is configured that when the plurality of teeth come into contact with a small limb or branch on a tree the plurality of teeth grip or hold the small limb or branch in place to allow the chainsaw blade to cut it.

BRIEF DESCRIPTION OF THE DRAWINGS

The particular objects and features of the invention as well as the advantages will become apparent from the following description taken in connection with the accompanying drawings in which:

FIG. 4 is a side view of a gripper bar as included in an embodiment of the present invention.

DETAILED DESCRIPTION OF THE INVENTION

The following description of the preferred embodiments of the invention is intended to enable someone skilled in the prior art to make and use this invention but is not intended to limit the invention to these preferred embodiments.

Figure 1:
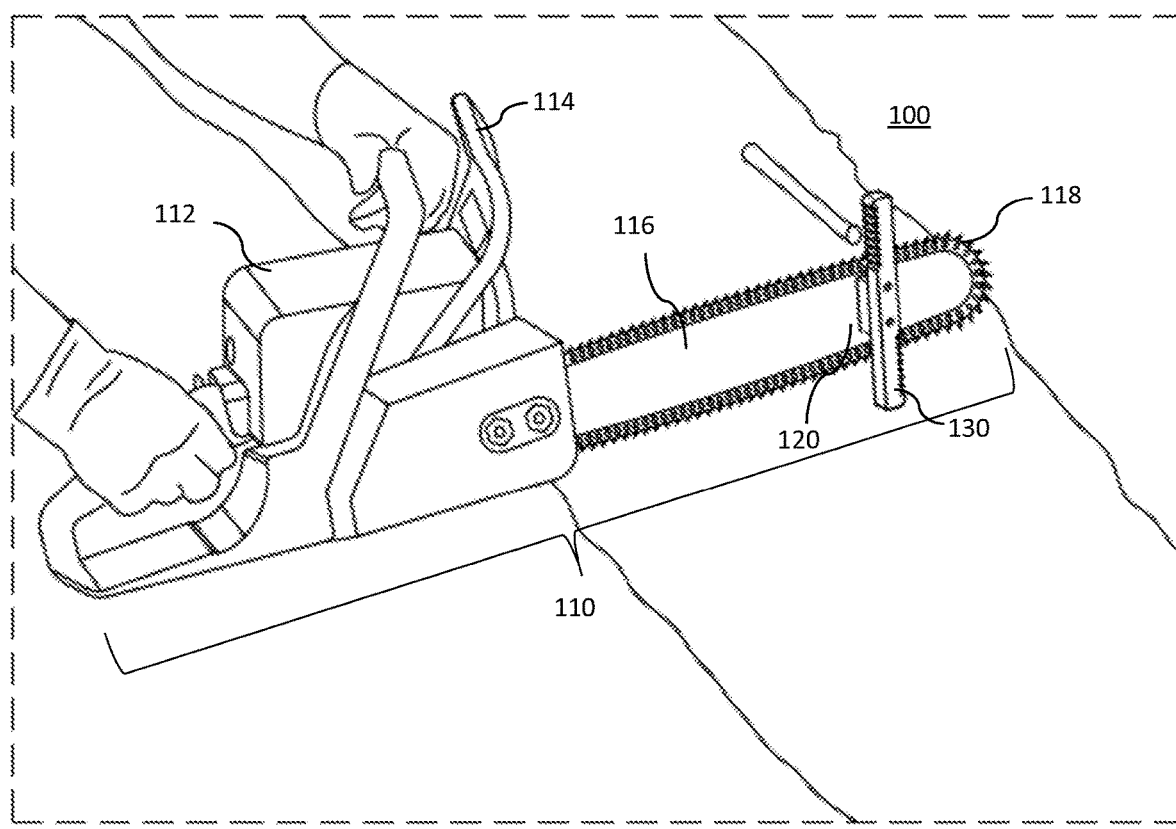
FIG. 1 is a perspective view of a CHAINSAW SYSTEM according to an embodiment of the present invention.

Referring now to the attached drawings, FIG. 1 shows the present invention is preferably a chainsaw limb gripping attachment system 100 comprising a chainsaw 110 comprising a motor 112 with a handle 114 configured for holding by a user, a guide bar 116 configured to extend away from the motor, and a plurality of cutting teeth 118 positioned around a periphery of the guide bar 116 and configured to rotate; and a gripper bar 130 comprising a center section removably attached to the guide bar 116, an upper section extending upwardly from the center section 132, and a lower section extending downwardly from the center section 132. The plurality of cutting teeth 118 typically move in a clockwise direction around the periphery of the guide bar 116.

Figure 2:
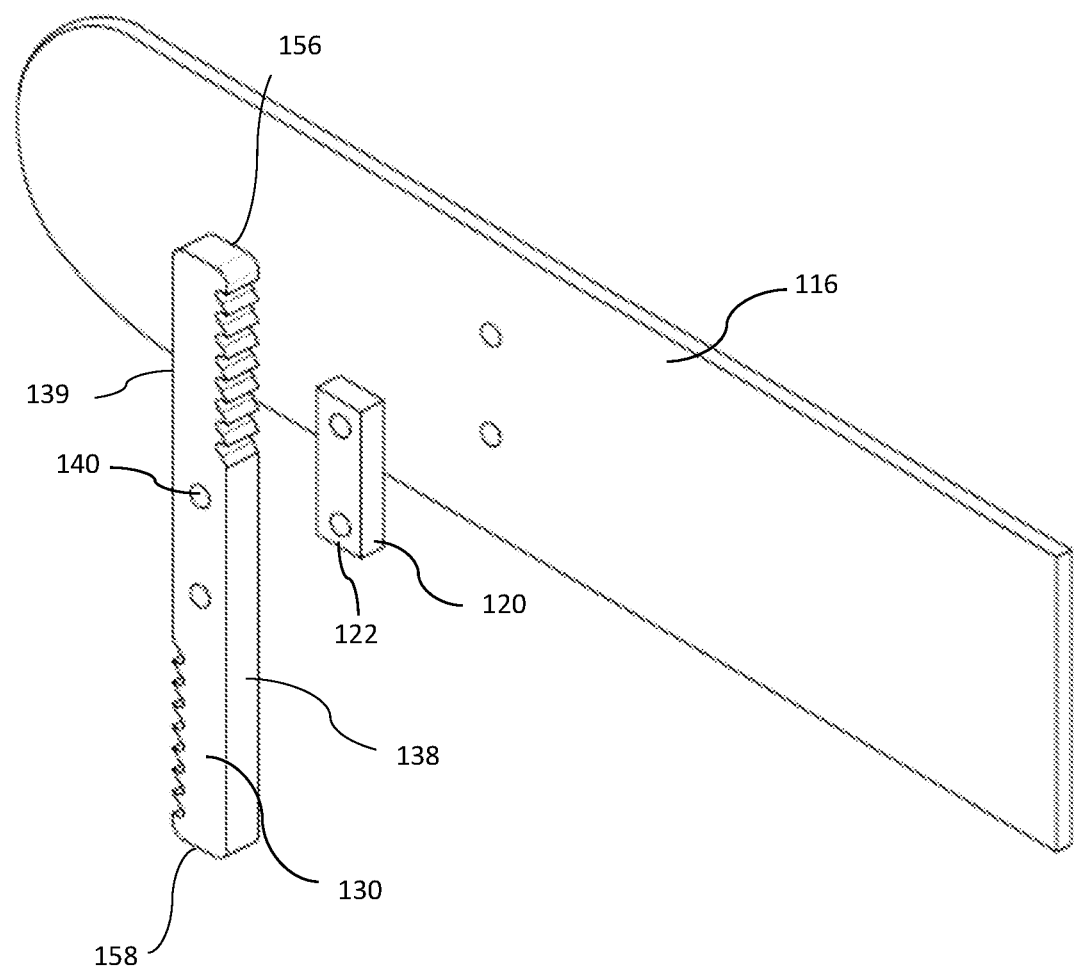
FIG. 2 is a perspective exploded view of Section A of FIG. 1 according to an embodiment of the present invention.

As further shown in FIGS. 1 and 2, in another embodiment, the invention comprises a spacer 120 configured to be located between the gripper bar 130 and the guide bar 116 to keep the plurality of cutting teeth 118 from contacting the gripper bar 130. The spacer 120 is preferably removably attached to either side of the center section 132 of the gripper bar 130. The spacer 120 and gripper bar 130 are configured to preferably be removably attached to either side of the chainsaw guide bar 116.

As shown in FIG. 2, the spacer 120 comprises a through hole 122 for a fastener to pass through and removably attach the spacer 120 to the side of the guide bar 116 of the chainsaw. The spacer 120 is preferably a piece of material approx. one quarter inch thick, or thick enough to separate the gripper bar from the guide bar and plurality of rotating cutting teeth. The spacer 120 is preferably comprised of a hard plastic or metal material. The fastener 124 could be any type of fastener such as a screw or bolt, however, other types of fasteners not enumerated herein could be used.

As further shown in FIG. 2, the spacer 120 is removably attached to the guide bar 116 with a fastener 124, and the gripper bar 130 is removably attached to the spacer 120 using a fastener hole 140. In other embodiments, the gripper bar 130 is removably attached to the guide bar 116 with the spacer 120 in between the gripper bar 130 and the guide bar 116. In this embodiment, the fastener 124 passes through a hole in the gripper bar 130 and through the hole in the spacer 120 to the guide bar 116. Preferably, there are at least two holes in each of the gripper bar 130 and spacer 120 to prevent the spacer and gripper bar from rotating about the fastener.

As further shown in FIGS. 1-4, the gripper bar 130 preferably comprises a center section 132, a first section 134 extending in a first direction away from the center section 132 to a first end 156, and a second section 136 extending in a second direction opposite the first direction away from the center section 132 to a second end 158. The center section 132 of the gripper bar 130 preferably comprises a fastener hole 140 extending from side to side for a fastener to pass through. When mounted on the guide bar 116 of the chainsaw, the gripper bar 130 is oriented generally perpendicular to a longitudinal axis of the guide bar 116.

Figure 3:
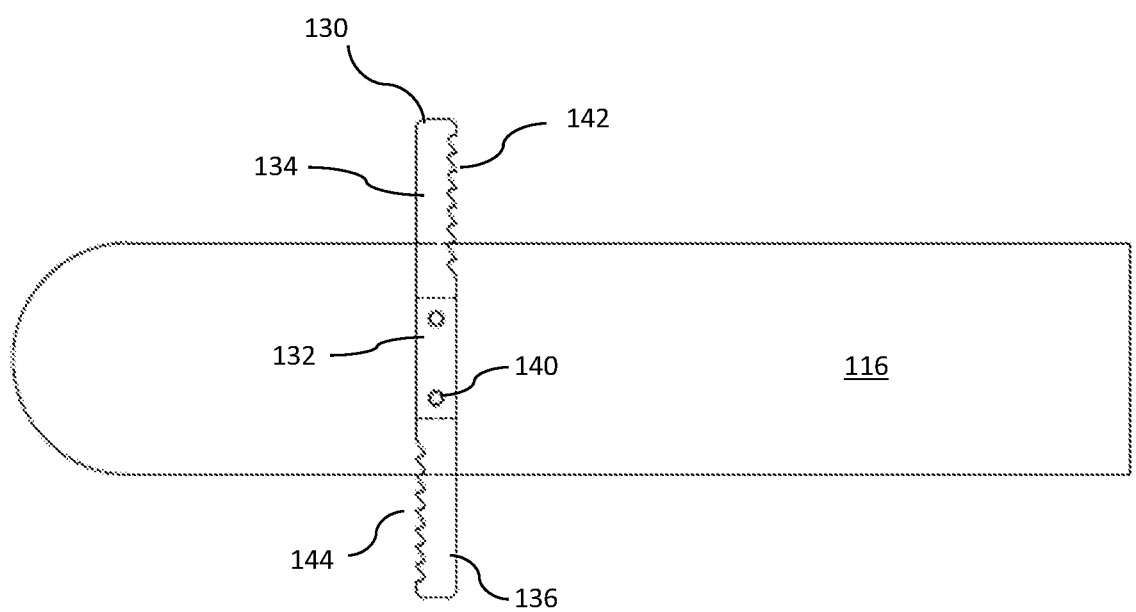
FIG. 3 is a side view of Section A of FIG. 1 according to an embodiment of the present invention.

As further shown in FIGS. 2-4, the gripper bar 130 measures approximately six inches in length. The gripper bar 130 comprises a substantially rigid material such as, for example, a metal or plastic material. The gripper bar 130 is configured to be removably attached to either side of the guide bar 116. The gripper bar 130 may be removably attached using fasteners or other means not enumerated herein.

As further shown in FIGS. 1-4, the gripper bar 130 further comprises a first gripping section 142 on a first surface 138 of the first section 134. In another embodiment, the gripper bar 130 further comprises a second gripping section 144 on a second surface 139 of the second section 136. Preferably, the first surface 138 and second surface 139 extends from the first end 156 to the second end 158 and the first surface 138 is parallel to the second surface 139. Both the first and second gripping sections are configured to face the direction the plurality of cutting teeth 118 travel when the chainsaw is operating.

In one embodiment, the first 142 and second 144 gripping sections preferably comprise a plurality of teeth 146, such as a serrated edge, and are configured to hold a limb or branch that comes in contact with the gripping sections. In one embodiment, the plurality of teeth 146 are generally triangle shaped.

Figures 4A, 4B:
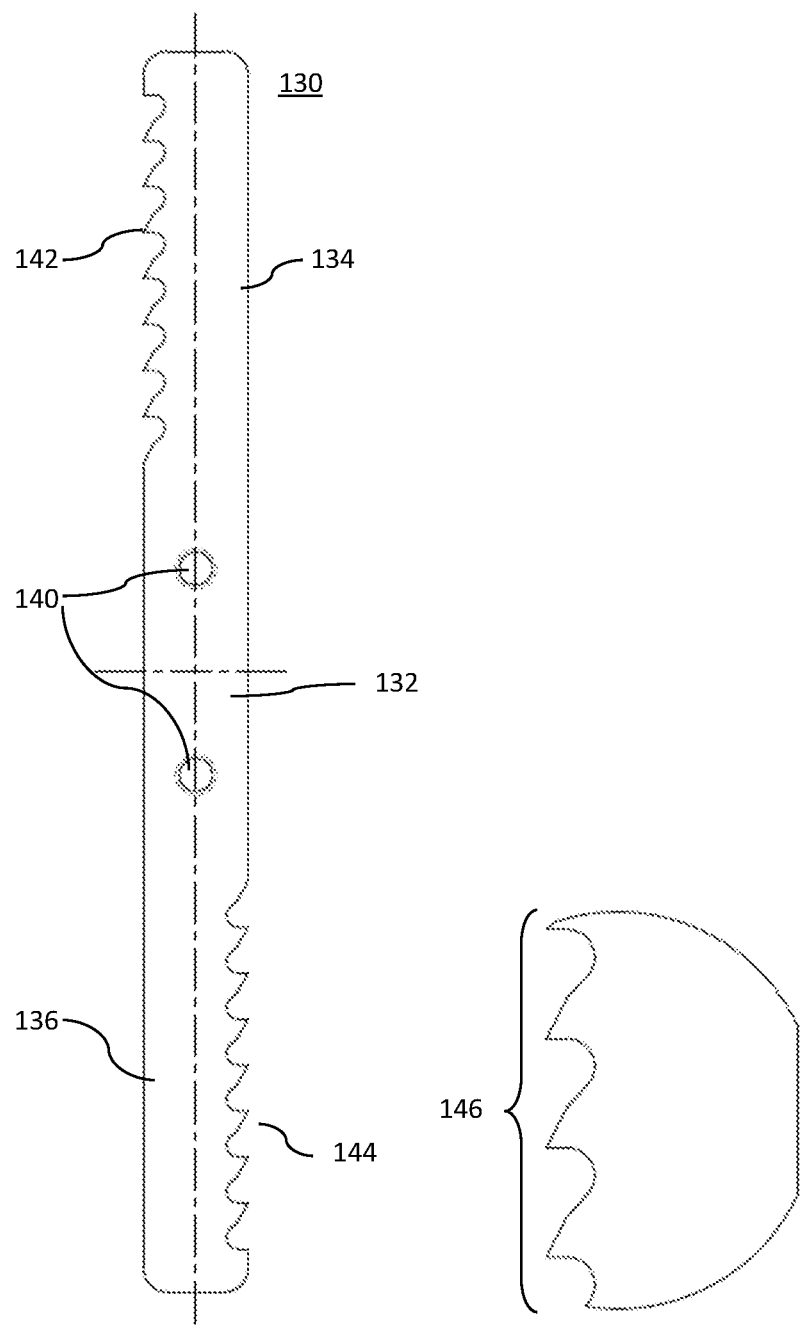
FIG. 4A is a close-up side view of the gripping teeth on the gripper bar as shown in FIG. 1 according to an embodiment of the present invention.

In another embodiment as shown in FIGS. 4 and 4A, the plurality of teeth 146 are generally curved toward the guide bar and plurality of cutting teeth. This means that the first gripping section 142 comprise a plurality of teeth 146 generally curved downwardly, and the second gripping section 144 comprise a plurality of teeth 146 generally curved upwardly. The generally curved plurality of teeth 146 are configured to allow a limb or branch to move toward the guide bar 116 and plurality of cutting teeth 118 but prevent the limb or branch from moving away from the plurality of cutting teeth 118.

In some embodiments, a hole is drilled through the guide bar 116 of the chainsaw to accept a fastener 124. In one embodiment, the guide bar hole is threaded such that the fastener couples directly to the hole in the guide bar. In another embodiment, the guide bar hole is smooth and a retaining fastener is threaded or attached to the fastener 124.

In other embodiments, the spacer 120 further comprises at least one magnet for removably attaching the spacer to the guide bar. The at least one magnet is preferably recessed in the spacer, held in place by an adhesive or press-fit into the recess. The at least one magnet is preferably strong enough to prevent the spacer 120 from moving during operation of the chainsaw 100.

In another embodiment, the gripper bar 130 further comprises at least one magnet in the center section 132 to removably attach the gripper bar 130 to the spacer 120. In this embodiment, the magnet is placed within a recess and secured in place with an adhesive or press fit such that the at least one magnet will be attracted to either the spacer 120 or the guide bar 116 of the chainsaw.

Figure 5A:
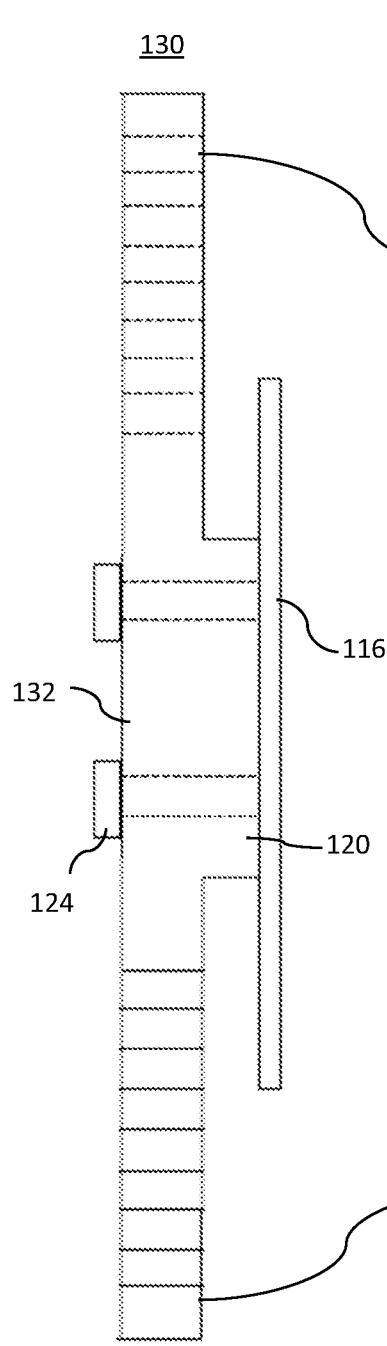
FIGS. 5A and 5B are close-up side views of Section A of FIG. 1 according to an embodiment of the present invention.

In one embodiment, as shown in FIG. 5A, the gripper bar 130 comprises a center section 132 further comprising a spacer 120 integral to the gripper bar 130 on one side. The integrated spacer 120 extends outwardly from the side of the gripper bar 130 to be removably attached to the guide bar 116 such that the generally vertical gripper bar 130 does not come into contact with the plurality of rotating cutting teeth 118 of the chainsaw.

In another embodiment, the gripper bar 130 comprises a center section 132 removably attached to the guide bar 116 wherein the upper section 134 and lower section 136 comprise a first bend 152 away from the center section 132. The first bend 152 is at an angle to position the upper and lower sections away from the guide bar 116 and plurality of cutting teeth 118. The first bend 152 preferably positions the upper and lower sections at about a 5-20 degree angle from parallel in relation to the guide bar 116.

Figure 5B:
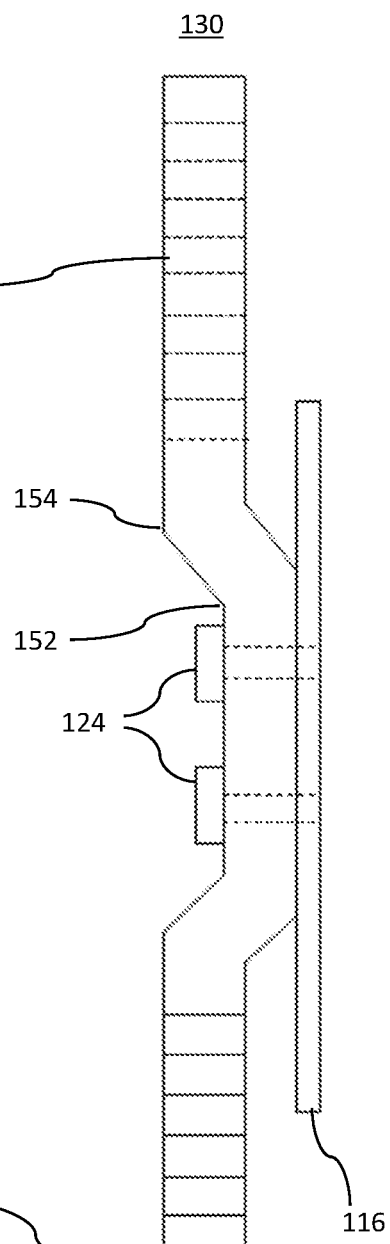

In another embodiment shown in FIG. 5B, the upper section 134 and lower section 136 preferably comprise a second bend 154 to position the upper and lower sections distanced but relatively parallel to the guide bar 116.

Although the present invention has been described by way of example, it should be appreciated that variations and modifications may be made without departing from the scope of the invention. Furthermore, where known equivalents exist to specific features, such equivalents are incorporated as if specifically referred to in this specification.

What is claimed is:

1. A chainsaw system comprising:
   a motor with a handle configured for holding by a user during use;
   an elongated guide bar configured to extend away from the motor and the user during use;
   a plurality of cutting teeth positioned around a periphery of the guide bar and configured to rotate on a chain therearound; and
   a gripper bar comprising a center section removably attached to the guide bar, a first section extending in a first direction away from the center section to a first end, and a second section extending in a second direction opposite the first direction and away from the center section to a second end;
   wherein the gripper bar extends along a plane perpendicular to the guide bar and comprises a first surface extending from the first end to the second end, and a second surface opposite the first surface extending from the first end to the second end;

wherein the gripper bar further comprises a first gripping section disposed on the first surface of the first section, the first gripping section comprising a first plurality of identical teeth inset from the first surface;

wherein the gripper bar further comprises a second gripping section disposed on the second surface of the second section, the second gripping section comprising a second plurality of identical teeth inset from the second surface;

wherein the gripper bar is mounted between two ends of the elongated guide bar and has the first plurality of identical teeth with each tooth curved toward the guide bar and the second plurality of identical teeth with each tooth curved toward the guide bar; and wherein one of the first and second gripping section is configured to hold a limb in place for the plurality of cutting teeth to cut.

2. The chainsaw system of claim 1, wherein the second plurality of gripping teeth is configured to curve toward the guide bar and the plurality of cutting teeth.

3. The chainsaw system of claim 1, wherein the first plurality of gripping teeth is configured to curve toward the guide bar and the plurality of cutting teeth.

4. The chainsaw system of claim 1, further comprising a spacer disposed between the center section of the gripper bar and the guide bar.

5. The chainsaw system of claim 4, wherein the spacer is removably attached to the guide bar, and the center section of the gripper bar is removably attached to the spacer.

6. The chainsaw system of claim 4, wherein the spacer is comprised of a plastic material.

7. The chainsaw system of claim 4, wherein the spacer is integral to the gripper bar.

8. The chainsaw system of claim 1, wherein each of the first section and the second section comprises a respective first bend configured to position the each of the first section and the second section away from the plurality of cutting teeth.

9. The chainsaw system of claim 8, wherein the each of the first section and the second section comprises a respective second bend configured to position the each of the first section and the second section parallel to the guide bar.

* * * * *